United States Patent Office 3,374,194
Patented Mar. 19, 1968

3,374,194
COCONUT OIL MODIFIED ALKYD RESINS AND COPOLYMERS THEREOF WITH AN ALKYL ACRYLATE
Robert H. Wholf, Anaheim, Calif., assignor to Allied Chemical Corporation, New York, N.Y., a corporation of New York
No Drawing. Continuation of application Ser. No. 120,509, June 29, 1961. This application July 20, 1967, Ser. No. 658,980
10 Claims. (Cl. 260—21)

This application is a continuation of copending application Ser. No. 120,509, filed June 29, 1961, now abandoned, and invention relates generally to improved synthetic resin coating compositions, and more particularly, to enamels prepared from acrylic-modified alkyd coating vehicles.

Finishes and enamels that are resistant to loss of gloss, discoloration and other defects, when exposed for prolonged periods to the deleterious effects of weather, have been sought for a long time. In this connection, the versatility of alkyd resins in the formulations of a variety of finishes and enamels is well-known. Modification of alkyd resins with vinyl-type monomers contributes many desirable properties. For example, acrylic-modified alkyds are useful as finishes for metal decorating and have important properties of rapid cure (either air-dried or baked), good color retention, durability, and salt-spray resistance. Usually acrylic-modified alkyd resins are prepared by reacting acrylic monomers with an alkyd intermediate through an unsaturated oil such as dehydrated castor oil. There is a wide difference in the reactivity of the vinyl monomers with the various drying oils. For example, drying oils with relatively high conjugated unsaturation, such as is found in dehydrated castor oil, react with acrylic monomers more readily than the less conjugated types, such as soya or linseed oils. However, there is some doubt that true copolymers are actually formed. In any case, while the drying oils do impart many useful properties to a coating resin, coating resins containing such oils have a tendency to discolor and lose gloss more quickly than when the saturated-type oils, such as coconut oil, are used instead.

Coating compositions comprising a saturated oil-modified alkyd resin that has been further modified with an acrylate are also broadly known. For example, in U.S.P. 2,857,344, there are disclosed acrylated coconut oil- or coconut oil acid-modified alkyd resins and pigmented lacquers containing the same. Such resins comprise an amount of maleic acid or anhydride ostensibly to furnish ethylenic unsaturation for permitting formation of the final acrylated copolymer resin. However, the alkyd resins disclosed in said patent are based specifically on butyl methacrylate-alkyd copolymers, wherein unesterified hydroxyl groups furnished by the phthalic-glyceride resin are present in amount equivalent to 0.4%–10.2% of glycerine.

It is pointed out in said U.S.P. 2,857,344 that other lower alkyl acrylates, including methyl and ethyl acrylates, are not the equivalent of butyl acrylate for preparing the compositions disclosed therein. The reason for this probably is that most, if not almost all, of the ethylenic unsaturation supplied by the maleic acid or anhydride is consumed during the preparation of the alkyd intermediate by homopolymerization thereof. The ultimate copolymers resulting upon reaction with the acrylate, particularly if the acrylate is alkyl lower than butyl, have been found to be undesirably unhomogeneous due in part to the non-plasticizing effect of the alkyd intermediate that is partially cross-linked through said consumed ethylenic unsaturation of said maleic acid or anhydride. Hence, as disclosed in said patent, the higher alkyl acrylate, butyl acrylate, must be used in forming the acrylated copolymer to supply at least some internal plasticizing effect due to the length of the alkyl ester groups. Withal, said acrylated oil-modified alkyd resins of the patent appear to be compatible only with the pigmented lacquers disclosed in said U.S.P. 2,857,344, that are based on nitrocellulose and which perforce comprise a lacquer solvent system of the kind commonly used in the nitrocellulose art and which must have high solvency power. Such solvent systems are conventionally organic liquid blends that are comprised entirely of mixtures of esters, ketones, and alcohols, or of such mixtures with minor amounts of aliphatic, aryl and/or aralkyl hydrocarbon solvents. Esters, ketones, and alcohols are, as a rule, appreciably more expensive than said hydrocarbon solvents and are also more volatile than the latter with attendant additional problems of handling during preparation, packaging, storing and using of the lacquers that comprise them.

With the foregoing disadvantages and drawbacks of the coating vehicles referred to above and of the enamels and lacquers containing them in mind, it is a principal object of this invention to provide novel vehicles and novel finishes comprising said vehicles that are resistant to weather without sacrifice of the desirable features of ordinary finishes such as ability to cure at moderately elevated temperatures, sufficient hardness to permit the finish to resist marring, and permanent adhesion to the substrate.

It is another object of the invention to provide novel acrylated, modified alkyd resin vehicles that do not require inclusion of drying or semi-drying oils or unsaturated fatty acids as modifiers.

It is yet another object to provide a method of preparing said acrylated, modified alkyd resin vehicles wherein inclusion of only a minimum amount of alpha-beta ethylenically unsaturated dibasic acid or anhydride is required.

It is yet another object of the invention to provide said method whereby said vehicles may comprise residues of lower alkyl acrylates and nevertheless be of desirably homogeneous characteristics.

Yet another object of the invention is to provide acrylated, modified alkyd resin vehicles that are particularly compatible with alkoxy-modified urea- and melamine-formaldehyde resins.

It is still another object of the invention to provide enamel compositions containing said novel acrylated oil-modified alkyd vehicles in admixture with said modified urea- and/or melamine-formaldehyde resins, in solvent systems that comprise the comparatively less volatile, less expensive hydrocarbon solvents.

The invention is based on the discovery that certain acrylic-modified alkyd copolymers that are particularly suitable as vehicles for certain modified urea- and/or melamine-formaldehyde resins in the preparation of enamels that are particularly durable and gloss-retentive even upon long exposure to weather, can be prepared from alkyd resins modified with a saturated monobasic acid that has at least nine carbon atoms, such as lauric acid, paratertiarybutyl benzoic acid, 2-ethyl hexyl carboxylic acid, pelargonic acid and the like, or a saturated oil, such as coconut oil, cottonseed oil, castor oil, and the like. Since said monobasic acids and said oils are of the saturated type, the unsaturation necessary to form a truly homogeneous copolymer in accordance with the present invention is furnished by incorporation in small amounts of an organic acid containing ethylenic unsaturation which preferably is an unsaturated dibasic acid such as maleic acid or anhydride or fumaric acid. However, it was found necessary to devise a system in which the unsaturation of the acid (or anhydride) employed would not be consumed during the preparation of the alkyd intermediate. Thus, saturated acid- and oil-modified alkyds which contain maleic anhydride, for example, would not yield a homogeneous copolymer when combined with acrylic monomer until I discovered that small amounts of hydroquinone, or other polymerization inhibitor such as anthraquinone, diphenylquinone, paraquinone, added to the above alkyd intermediate during processing, inhibited the consumption of unsaturation of the maleic anhydride.

Generally, the novel acrylated-modified-alkyd resin vehicles of the present invention comprise a copolymer of (1) an alkyd resin and (2) a lower alkyl acrylate of the group consisting of methyl methacrylate and ethyl acrylate, wherein the alkyd resin contains chemically-combined therein in the presence of from 0.005 to 0.5 weight percent of said alkyd of a polymerization stabilizer, (a) from 2 to 5 parts by weight of an ethylenically unsaturated organic acid, (b) from 25 to 60 parts by weight of a compound of the group consisting of saturated monobasic acids and non-drying fatty acid oils that have at least nine carbon atoms, (c) from 20 to 55 parts by weight of a phthalic acid, and (b) polyhydric alcohol in proportion to the total carboxylic acid components, whereby there are present excess hydroxyl groups in amount that is at least 10% above that required to react stoichiometrically with the carboxyl groups of said carboxylic acid components. Preferably, the copolymer is dissolved in a solvent system that comprises at least in major proportion by weight, a volatile aliphatic and/or aralkyl compound.

Particularly useful enamels, in accordance with the present invention, comprise, in admixture with (A) a dissolved modified alkyd-acrylate copolymer of the type described above; (B) an alkoxy-modified amine-formaldehyde resin of the type referred to in greater detail hereinafter and which is particularly compatible with said copolymer. Preferably, there are also included in the enamels, (C) a sufficient amount of said volatile aliphatic and/or aralkyl solvent system (by further addition, if necessary) to assure solution of said amine-formaldehyde resin as well as said copolymer, and (D) a pigment suspended in said volatile organic solvent solution of said copolymer and said amine-formaldehyde resin.

The term "alkyd resin" as employed in the art and in this specification designates generically polymeric polyesters of polyhydric alcohols having more than two hydroxyl groups and resinifying polycarboxylic organic acids or their anhydrides. It has been common practice for some time to modify the composition of such alkyd resins for various prior art purposes by the introduction of organic monocarboxylic fatty acids derived from vegetable oils or animal fats to replace a portion of the polycarboxylic acid in the resin. Generally, this may be effected by simultaneous cooking of the monocarboxylic fatty acid with the polyhydric alcohol and the dicarboxylic acids in a single-stage operation.

Another way is to proceed in two stages. The first stage consists of heating the oil containing the monocarboxylic fatty acids in the form of tri-glycerides with a polyhydric alcohol, in order to produce a mixture of partial esters of polyhydric alcohols and monocarboxlyic fatty acids by the so-called "alcoholysis" of the oil as described in U.S.P. 2,044,747. In the second stage, this mixture of partial esters is condensed with polycarboxylic acid to a substantially completely esterified alkyd resin of a low acid number.

In preparing the modified alkyd resins of the present invention that are particularly suitable for copolymerization with the lower alkyl acrylate, in accordance with one preferred method of procedure, the dibasic acid, polyhydroxy alcohol, and, in this case, the saturated monobasic acid, are admixed with a small amount of ethylenically unsaturated organic acid or anhydride and a stabilizing amount of inhibitor, e.g., hydroquinone. Suitable ethylenically unsaturated organic acids that may be used are methacrylic and acrylic acids, for example. Preferably, the unsaturated acid is a dibasic acid, e.g., itaconic acid, citraconic acid, mesaconic acid, and excellent results have been obtained with the use of maleic acid and anhydride and fumaric acid. As referred to hereinbefore, the inhibitor may be present in amount that is from 0.005 to 0.5 weight percent of the modified alkyd produced. Preferably, the inhibitor is present in the range of from 0.01 to 0.10 weight percent of the alkyd. Excellent results are obtained when from 0.03 to 0.05 weight percent of inhibitor is employed. The aforesaid components are then heat-reacted, preferably in the temperature range of 180° to 260° C. under an inert atmosphere, such as a moderate stream of carbon dioxide, until the acid number is reduced to from 6 to 15. Thereafter, a hydrocarbon solvent is added to reduce the solids concentration of the resin to preferably 50% to 80%. Particularly good results are obtained when from 0.03 to 0.05 weight percent of inand the solids content of the resulting resin is reduced to about 70%.

In an alternative method of preparing the modified alkyd resins, wherein an oil of a fatty acid rather than the fatty acid itself is used, the fatty acid oil and preferably only part of the polyhydroxy alcohol component are reacted separately at a temperature of 180° C. to 260° C. in the presence of a small amount of an alcoholysis catalyst, e.g., calcium naphthenate, preferably, until a sample of one part of the mixture becomes compatible with at least three parts of methyl alcohol. Thereafter, the dicarboxylic acid components, e.g., phthalic anhydride and maleic anhydride, with the remainder of the polyhydroxy component and a small amount of the stabilizing compound are added to the batch, which is then heated and maintained at a temperature of from about 180° C. to about 260° C. for from about 2 to 10 hours, at which time the acid number is less than 10. Thereafter, a hydrocarbon solvent is added to the resultant resin to dilute it to a solids concentration of from about 50% to about 80%. Preferably, the alcoholysis is performed at a temperature of about 235° C. and the esterification at about 220° C.

In the preparation of the novel copolymers of the invention, the resulting monocarboxylic acid- or saturated oil-modified alkyd intermediate in hydrocarbon solution is admixed with an acrylate monomer and a polymerization catalyst, preferably by small increment addition of a mixture of the acrylate and the catalyst to the hydrocarbon solution of said alkyd intermediate that has been previously brought to its reflux temperature. After complete addition of the acrylate and catalyst to the alkyd intermediate solution, the batch is preferably held at reflux temperature for a period of time after which it is thinned with additional solvent, preferably to about 50% solids and a Gardner-Holdt viscosity of about P.

In the preparation of the enamel, preferably the pigment to be used is ground with a portion of the thinned copolymer resin solution to produce a smooth paste. Thereafter, the rest of the acrylic alkyd copolymer and the alkoxy-modified amine-aldehyde resin, preferably in solution in a hydrocarbon system, are admixed, with addition of still more hydrocarbon solvent when necessary to give an enamel of spraying consistency if such is desired.

The polyhydric alcohols suitable for preparation of the alkyd resins of the present invention are those that have at least three hydroxy groups, e.g., glycerine, trimethylol ethane, trimethylol propane, pentaerythritol, or other polyhydric alcohols known to this art. Mixtures of two or more polyhydric alcohols may, of course, also be used, and it has also been found desirable in certain instances to include as minor part of the polyhydric alcohol component, not exceeding about 35 mol percent thereof, a glycol such as ethylene glycol, propylene glycol, butylene glycol, a polyglycol, etc., or mixtures thereof.

As major polycarboxylic acid component of said alkyd resins, phthalic acid or anhydride is preferred, as is also well-known in this art. As is moreover conventional in this art, wherever an acid is referred to in this specification and the accompanying claims, the corresponding anhydride, if existing, is likewise meant as a full equivalent. Among the polycarboxylic acids and anhydrides which may be employed in preparing the modified alkyds of the present invention, there may be mentioned, for example, the isomers of phthalic acid, i.e., terephthalic and isophthalic acids, and the hydrocarbon derivatives thereof, e.g., 4-tertiary-butyl phthalic acid, 5-tertiary-butyl isophthalic acid, etc. Also usable in certain applications are, for example, succinic acid, adipic acid, azelaic acid, endomethylene tetrahydrophthalic or chlorendic acid or anhydride, maleic acid, malonic acid, sebacic acid and the like.

As saturated monobasic acid component of the resin alkyds, in accordance with the present invention, there should be utilized, as referred to hereinbefore, a monobasic acid having at least 9 carbon atoms, e.g., lauric acid, para-tertiary-butyl benzoic acid, 2-ethyl hexyl carboxylic acid, pelargonic acid, etc., or mixtures thereof. In lieu of the saturated monobasic acid component or in substitution for a part thereof, a saturated-type oil such as coconut oil, cottonseed oil, castor oil, etc., may be utilized.

The amount of saturated monobasic acid or oil employed to prepare the alkyds of the present invention may comprise from 25% to 60% by weight of such alkyds prior to copolymerization with the acrylate. Preferably, the alkyds contain from 40% to 50% by weight thereof of said modifying acid or oil. The acid- or oil-modified alkyd resin intermediates of the invention are prepared from said polyhydric alcohols and carboxylic acids that are present in proportions so that the total amount of polyhydric alcohol component is in excess over that needed to stoichiometrically react with the carboxylic acid groups of the acid components to prevent gelation of the alkyd resin during processing and to provide reactive sites for the alkoxy-modified amineformaldehyde resins with which they are admixed to form the final enamel compositions. The excess hydroxyl content of the alkyds prepared for purposes of the present invention may range from 10% to 75%, with 20% to 45% being the preferred range. Esterification should be carried out to the extent that the modified alkyd intermediate has an acid number in the range of from 1 to 25, based on resin solids, with the acid number range of 6–15 preferred.

The lower alkyl acrylates that result in the novel copolymers of the invention are of the group consisting of methyl methacrylate and ethyl acrylate. It has been found that better results are obtained when mixtures of those two acrylates are employed since use of methyl methacrylate only tends to result in brittleness in the copolymers, while use of ethyl acrylate alone or of higher alkyl acrylates such as butyl acrylate results in copolymers that are undesirably soft for preparing coating compositions in accordance with the invention. The acrylate mixtures may contain methyl methacrylate and ethyl acrylate in weight ratio range of 0.25:1 to 4:1, and preferably in the range of 2:1 to 0.5:1. Excellent results are obtained by employing about a 1:1 ratio.

The alkyl acrylates may be reacted in a range of proportions with the modified alkyd whereby the resulting acrylate-alkyd copolymers may contain anywhere from 20% to 60% by weight thereof of residues of the acrylate monomer used. However, it is preferred that the acrylate residues comprise from 30% to 50% by weight of the copolymer.

The alkoxy-modified amine-formaldehyde resins particularly useful in the preparation of enamels and finishes in accordance with the present invention are those derived from urea and/or melamine by the reaction therewith of formaldehyde followed by alkylation of the resulting polymethylol derivative with an alcohol having one to six carbon atoms, such as n-butyl alcohol, isobutyl alcohol and sec-butyl alcohol, as well as 2-ethylbutanol, n-hexanol, and cyclohexanol. The preferred resins are those modified with n-butyl alcohol. The resins may be produced in any conventional fashion, such as by the methods disclosed in U.S.P. 2,259,980, that include the usual procedure of first reacting the nitrogen-containing compound with formaldehyde in aqueous or aqueous-alcoholic solution under alkaline conditions and then reacting the resulting polymethylol derivative with the chosen alcohol under acid conditions to produce the final modified resin. Amine-formaldehyde resins of the described type are presently obtainable commercially, and exemplary thereof are Plaskon melamine resins 3382 and PR–348 and Plaskon urea resins 3300 and 3353 that are manufactured and distributed by Allied Chemical Corporation.

In the preparation of the enamels containing the acrylate-modified alkyd copolymers and the alkoxy-modified amine-formaldehyde resins, as little as 5% and as much as 60% of the total weight of such compositions, based on resin solids, may be the alkoxy-modified amine-formaldehyde resin that functions to convert the coatings to the final insoluble and infusible state. Preferably, from 20% to 30% of the total weight of said compositions, based on resin solids, should be contributed by the alkoxy-modified amine-formaldehyde resins employed. Sufficient solvent may be added to give the product, that may also contain pigments and/or other solid additives, the consistency desired for the particular application contemplated. As emphasized hereinbefore, the unique nature of the products of the invention permits the utilization of solvent systems based on the less expensive, less volatile hydrocarbon solvents.

The invention is further illustrated, but not to be construed as necessarily limited, by the following examples thereof:

EXAMPLE 1

A.—*Preparation of the alkyd intermediate*

| Component: | Parts by weight |
|---|---|
| Para-tertiary-butyl benzoic acid | 15.0 |
| Pelargonic acid | 25.0 |
| Phthalic anhydride | 26.0 |
| Glycerine | 15.0 |
| Trimethylolethane | 16.0 |
| Maleic anhydride | 3.0 |
| Hydroquinone | 0.03 |

The above components were heated to a temperature of about 225° C. in a flask equipped with a stirrer, thermometer and inlet tube through which a moderate stream of carbon dioxide was passed into the mixture until the acid number was between 6 and 10. Xylol was added to reduce the resin to 70% solids to facilitate handling. The resin solution had a Gardner-Holdt viscosity of U.

B.—Preparation of the copolymer

| Component: | Parts by weight |
|---|---|
| Alkyd intermediate (above) | 200.0 |
| Xylol | 38.0 |
| Methyl methacrylate monomer | 58.3 |
| Ethyl acrylate monomer | 35.0 |
| Tert-butyl perbenzoate | 1.8 |

The alkyd intermediate, and xylol were heated in a closed kettle equipped with an agitator, thermometer, and reflux condenser to the reflux temperature of the charge (about 138° C.). Over a period of one hour, the mixture of the monomers and tert-butyl perbenzoate was added to the batch. The batch was held at its reflux temperature (about 135° C.) for about 5 hours. The batch was thinned to 60% solids with xylol. The product had a Gardner-Holdt viscosity of $Z_1$. A 3-mil wet film spread on a glass plate baked 15 minutes was clear, hard and glossy.

EXAMPLE 2

A.—Preparation of the alkyd intermediate

| Component: | Parts by weight |
|---|---|
| Para-tertiary-butyl benzoic acid | 409 |
| Glycerine | 150 |
| Trimethylolethane | 150 |
| Phthalic anhydride | 255 |
| Maleic anhydride | 35 |
| Hydroquinone | 0.5 |

The process details were the same as in Example 1(A). The batch was thinned to 60% solids in xylol. The product had a Gardner-Holdt viscosity of T.

B.—Preparation of the copolymer

| Component: | Parts by weight |
|---|---|
| Alkyd intermediate (above) | 640 |
| Xylol | 99 |
| Methyl methacrylate monomer | 128 |
| Ethyl acrylate | 128 |
| Tert-butyl perbenzoate | 5.1 |

The process details were the same as given in Example 1(B). The final product, thinned to 60% solids in xylol had a Gardner-Holdt viscosity of W. A baked film was clear, hard and glossy.

EXAMPLE 3

A.—Preparation of the alkyd intermediate

| Component: | Parts by weight |
|---|---|
| "Hydrofol" 630 (coconut fatty acid)[1] | 275 |
| Phthalic anhydride | 337 |
| Maleic anhydride | 30 |
| Trimethylolethane | 313 |
| 2,3-butylene glycol | 39 |
| Hydroquinone | 0.3 |

[1] "Hydrofol" 630 is manufactured by Archer-Daniels-Midland.

The above components were heated to a temperature of 210° C. in a flask equipped with a stirrer, thermometer and inlet tube through which a moderate stream of carbon dioxide was passed into the mixture, until the acid number was between 6 and 10. Xylene was added to reduce the resin to 70% solids concentration. The resulting resin solution was clear and had a Gardner-Holdt viscosity of $Z_4$.

B.—Preparation of the copolymer

| Component: | Parts by weight |
|---|---|
| Alkyd intermediate (above) (10% solids in xylene) | 286 |
| Methyl methacrylate monomer | 133 |
| Tertiary butyl perbenzoate (catalyst) | 2.7 |
| Xylene (solvent) | 19 |

The alkyd intermediate and xylene were heated in a closed kettle, equipped with an agitator, thermometer and reflux condenser, to its reflux temperature (about 138° C.). Over a period of one hour the mixture of methyl methacrylate and tertiary butyl perbenzoate was added dropwise to the batch. For about five hours the batch was held at its reflux temperature (about 135° C.). The batch was thinned with xylene to 50% solids and had a Gardner-Holdt viscosity of about P. A 3-mil wet film of the product, which was spread on a glass plate and baked 15 minutes at 250° F., was clear, hard and glossy.

EXAMPLE 4

A. Preparation of the alkyd intermediate

| Component: | Parts by weight |
|---|---|
| "Hydrofol" 630 (coconut fatty acid) | 380 |
| Phthalic anhydride | 270 |
| Maleic anhydride | 30 |
| Trimethylolethane | 320 |
| Hydroquinone | 0.4 |

Process details for the alkyd intermediate and formation of the acrylic-alkyd copolymer were the same as in Example 3 (A) and (B).

B. Preparation of enamel

| Component: | Parts by weight |
|---|---|
| Acrylic-alkyd copolymer (above) | 528 |
| Melamine coating resin solution[1] (55% solids in xylol-butanol mixture) | 160 |
| Xylene | 66 |
| Titanium dioxide pigment | 252 |

[1] Plaskon melamine resin 3385, an alkoxy-modified melamine-formaldehyde resin manufactured and sold by Allied Chemical Corporation, was used.

The enamel was prepared by grinding the pigment with a portion of the copolymer resin solution to produce a smooth paste. The remaining components were added and mixed to give an enamel with spraying consistency. The enamel may be applied by brushing, dipping or spraying. Spraying is the preferred method.

A set of test panels was prepared by applying films to bonderized steel panels. The films were cured by baking 30 minutes at 250° F. The coating had gloss reading of about 90 (60° gloss measurement[1]). Panels exposed in an Atlas "Weather-Ometer" had a gloss reading of 80 after 220 hours while a similar enamel based on a high quality coconut oil alkyd had dulled and given a gloss reading of 36 after exposure for 220 hours. This difference in gloss retention is significant. It shows that resins of the invention are more durable than prior coatings.

EXAMPLE 5

A. Preparation of the alkyd intermediate

| Component: | Parts by weight |
|---|---|
| X: | |
| Coconut oil | 4210 |
| Glycerine | 1269 |
| Calcium naphthenate (5%) | 16 |
| Y: | |
| Phthalic anhydride | 4990 |
| Maleic anhydride | 390 |
| Glycerine | 1313 |
| 2,3-butylene glycol | 1170 |
| Hydroquinone | 6 |

Components in group X were heated in a flask fitted with a stirrer, thermometer and inlet tube through which carbon dioxide was bubbled into the reaction mixture at a temperature of 235° C. until a sample of one part of the mixture became compatible with at least three parts of methyl alcohol. Components in group Y were added to the batch and heated to 220° C. for about 3 hours. Xylene was added to the resulting resin to dilute it to

[1] By Gardner Glossmeter.

70% solids concentration. The acid number of the resin solution was about 7 and the Gardner-Holdt viscosity was about Z$_2$.

B. Preparation of the copolymer

| Component: | Parts by weight |
|---|---|
| Alkyd intermediate (above) (70% solids in xylene) | 500.0 |
| Methyl methacrylate | 116.6 |
| Ethyl acrylate | 116.7 |
| Tertiary butyl perbenzoate | 4.6 |
| Xylene | 95.0 |

The alkyd intermediate and xylol were heated in a closed reaction vessel, equipped with a thermometer, agitator and reflux condenser, to reflux temperature (about 138° C.). Methyl methacrylate, ethyl acrylate and tertiary butyl perbenzoate were mixed and added dropwise in about two hours. The batch was heated at reflux temperature (about 138° C.) for about 4 hours. The resulting resin was cooled and thinned with xylene to 60% solids. Its solution was clear and had a Gardner-Holdt viscosity of about O.

C. Preparation of enamel

An automotive enamel was prepared as described above in Example 4(B). Films sprayed on bonderized steel were baked 20 minutes at 275° F. Test panels were exposed in Florida and in an Atlas "Weather-Ometer." Gloss readings were taken periodically over about 1500 hours. The acrylic-alkyd copolymer remained quite glossy while the enamels based on a commercially-obtainable high quality coconut-alkyd resin became very dull, as demonstrated by the data in Tables I and II below:

TABLE I.—GLOSS (60°) READINGS DURING "WEATHER OMETER" EXPOSURE

| | Hours | | | | | | |
|---|---|---|---|---|---|---|---|
| | In t'al | 350 | 580 | 800 | 1,000 | 1,250 | 1,500 |
| Acrylic-Alkyd Copolymer | 89 | 83 | 85 | 83 | 80 | 74 | 62 |
| Pr or Alkyd Copolymer | 87 | 76 | 69 | 66 | 46 | 26 | 21 |

TABLE II.—GLOSS (60°) READINGS DURING FLORIDA EXPOSURE

| | Months | | | | |
|---|---|---|---|---|---|
| | 0 | 6 | 12 | 18 | 25 |
| Acryl'c-Alkyd Copolymer | 90 | 76 | 65 | 55 | 54 |
| Pr or Alkyd Copolymer | 87 | 60 | 18 | 7 | 8 |

The acrylic-alkyd copolymers of the invention are useful in preparing coatings which furnish improved exterior durability, excellent retention of color and gloss, desirable detergent resistance and rapid curing properties. The enamels prepared with said acrylic-alkyd copolymers and the alkoxy-modified amine-formaldehyde resins, also in accordance with the invention, are particularly useful as automotive topcoats, sign enamels and appliance finishes.

As will be apparent to those skilled in the art, many modifications and variations of the invention, as described herein, may be made without departing from the spirit and scope thereof and, accordingly, only such limitations thereof should be construed as are indicated in the appended claims.

I claim:
1. A method of preparing a modified alkyd resin that is capable of forming a homogeneous copolymer with an alkyl acrylate of the group consisting of methyl methacrylate and ethyl acrylate that comprises heat-reacting (a) from 2 to 5 parts by weight of an alpha ethylenically unsaturated organic acid, (b) from 25 to 60 parts by weight of coconut oil, (c) from 20 to 55 parts by weight of a saturated dicarboxylic acid, and (d) a proportion by weight of polyhydric alcohol whereby there are present excess hydroxyl groups in amount that is from 10% to 75% above that required to react stoichiometrically with the carboxyl groups of said carboxylic acid components in the presence of from 0.005% to 0.5% based on the weight of the reaction mass, of a polymerization inhibitor until an alkyd resin having an acid number of from 1 to 25 is formed.

2. A resinous copolymer of (1) a modified alkyd resin prepared by the process of claim 1 and (2) an alkyl acrylate of the group consisting of methyl methacrylate and ethyl acrylate, wherein residues of said alkyl acrylate comprise from 20% to 60% by weight of said copolymer.

3. A coating composition that comprises (A) a resinous copolymer as claimed in claim 2, and (B) an alkoxy-modified amine-formaldehyde resin compatible with said copolymer and comprising from 5% to 60% by weight of said compositions based on resin solids.

4. The method of claim 1 wherein (b) is 40 to 50 parts coconut oil, (c) is 20 to 40 parts phthalic acid and the proportion of (d) is such that there are present excess hydroxyl groups in amount that is from 20% to 45% above that required to react stoichiometrically with the carboxyl groups of said carboxylic acid components, and the components are heat reacted at 180° to 260° C. until an alkyd resin having an acid number of from 6 to 15 is formed.

5. A resinous copolymer of (1) a modified alkyd resin prepared as claimed in claim 4 and (2) an alkyl acrylate of the group consisting of methyl methacrylate and ethyl acrylate, wherein residues of said alkyl acrylate comprise from 30% to 50% of said copolymer.

6. A coating composition that comprises (A) a resinous copolymer as claimed in claim 5, (B) an amine-formaldehyde resin that is modified with an alcohol having from 1 to 6 carbon atoms, (C) a volatile hydrocarbon solvent system in which said resinous copolymer and said modified amine-formaldehyde resin are dissolved to form a solution, and (D) a pigment in said solution; said modified amine-formaldehyde resin comprising from 20% to 30% of said composition based on resin solids.

7. A method of preparing a coating composition that comprises (I) preparing a modified alkyd resin by heat reacting in the temperature range of 180° C. to 260° C., (A) from 2 to 5 parts by weight of an alkylene dicarboxylic acid of the group consisting of maleic and fumaric acids, (B) from 40 to 50 parts by weight of coconut oil, (C) from 20 to 50 parts by weight of a phthalic acid and (D) a proportion by weight of polyhydric alcohol whereby there are present excess hydroxyl groups in amount that is from 20% to 45% above that required to react stoichiometrically with the carboxyl groups of said carboxylic acid components, in the presence of from 0.01% to 0.10%, based on the weight of the reaction mass, of a polymerization inhibitor until an alkyd resin having an acid number of from 6 to 15 is formed; (II) thinning the resulting alkyd resin with a hydrocarbon solvent; (III) heating the thinned alkyd resin to reflux temperature; (IV) slowly adding to the refluxing alkyd resin, in the presence of a polymerization catalyst, a mixture of methyl methacrylate and ethyl acrylate that comprises from 0.5 to 2 parts by weight methyl methacrylate per 1 part by weight of ethyl acrylate, and continuing such addition until the resulting copolymer of alkyd resin and the alkyl acrylate comprises residues of said acrylates that amount to from 30% to 50% by weight of said copolymer; (V) thinning the copolymer solution again by addition of a hydrocarbon solvent; (VI) admixing the thinned copolymer with a pigment and an amine-formaldehyde resin that has been modified with an alcohol having from 1 to 6 carbon atoms, is dissolved in a hydrocarbon-containing solvent system, and is compatible with said copolymer; said copolymer solution and amine-resin solution being admixed in proportions so that said modified amine-formaldehyde resin comprises from 20% to 30% of the final composition based on resin solids.

8. A method of preparing a coating composition as claimed in claim 7, wherein the alkylene dicarboxylic acid component comprises maleic anhydride, the pathalic acid component comprises phthalic anhydride, the polyhydric alcohol component comprises glycerine, the polymerization inhibitor comprises hydroquinone, the hydrocarbon solvent comprises xylene, and the modified amine-formaldehyde resin comprises a butylated melamine formaldehyde resin.

9. A method of preparing a coating composition that comprises (I) preparing a modified alkyd resin by heat-reacting in the temperature range of 180° C. to 260° C., (A) from 2 to 5 parts by weight of maleic acid, (B) from 40 to 50 parts by weight of an alcoholysis product resulting from the heat reaction glycerine and coconut oil, and (C) from 20 to 50 parts by weight of phthalic anhydride; the proportion by weight of glycerine being present in amount whereby there are present excess hydroxyl groups in amount that is from 20% to 45% above that required to react stoichiometrically with the carboxyl groups of said carboxylic acid components; in the presence of from 0.01% to 0.10% based on the weight of the reaction mass, of a polymerization inhibitor until an alkyd resin having an acid number of from 6 to 15 is formed; (II) thinning the resulting alkyd resin with xylene; (III) heating the thinned alkyd resin to reflux temperature; (IV) slowly adding to the refluxing alkyd resin, in the presence of hydroquinone, a mixture of methyl methacrylate and ethyl acrylate that comprises from 0.5 to 2 parts by weight methyl methacrylate per 1 part by weight of ethyl acrylate, and continuing such addition until the resulting copolymer of alkyd resin and the alkyl acrylates comprises residues of said acrylates that amount to from 30% to 50% by weight of said copolymer; (V) thinning the copolymer solution again by addition of xylene; (VI) admixing the thinned copolymer with a pigment and a butylated melamine-formaldehyde resin that is dissolved in a hydrocarbon-containing solvent system and is compatible with said copolymer; said copolymer solution and melamine resin solution being admixed in proportions so that said melamine-formaldehyde resin comprises from 20% to 30% of the final composition based on resin solids.

10. A method of preparing a coating composition as claimed in claim 9 wherein the polymerization catalyst is tertiary-butyl perbenzoate.

References Cited

UNITED STATES PATENTS

| | | | |
|---|---|---|---|
| 2,259,980 | 10/1941 | West et al. | 260—21 |
| 2,632,751 | 3/1953 | Anderson. | |
| 2,647,093 | 7/1953 | Opp et al. | |
| 2,857,344 | 10/1958 | Walus | 260—22 |
| 2,953,536 | 9/1960 | Widmer | 260—21 |
| 2,988,524 | 6/1961 | Fitch. | |
| 2,990,384 | 6/1961 | Schmutzler et al. | |

DONALD E. CZAJA, *Primary Examiner.*

R. W. GRIFFIN, *Assistant Examiner.*